United States Patent
Paulsen et al.

(10) Patent No.: US 8,951,435 B2
(45) Date of Patent: Feb. 10, 2015

(54) CATHODE MATERIALS FOR LITHIUM BATTERY HAVING HIGHER PERFORMANCE

(75) Inventors: Jens M Paulsen, Daejeon (KR); Hong-Kyu Park, Daejeon (KR); Sun Sik Shin, Daejeon (KR); Sinyoung Park, Daejeon (KR); Hyeyun Cha, Daejeon (KR)

(73) Assignee: LG Chem, Ltd. (KR)

( * ) Notice: Subject to any disclaimer, the term of this patent is extended or adjusted under 35 U.S.C. 154(b) by 938 days.

(21) Appl. No.: 11/688,358

(22) Filed: Mar. 20, 2007

(65) Prior Publication Data

US 2008/0026292 A1  Jan. 31, 2008

(30) Foreign Application Priority Data

Mar. 20, 2006 (KR) ........................ 10-2006-0025116

(51) Int. Cl.
 *H01J 7/18* (2006.01)
 *H01M 4/88* (2006.01)
(52) U.S. Cl.
 USPC ..................... 252/182.1; 429/218.1; 429/223; 429/224
(58) Field of Classification Search
 USPC ....................................................... 252/182.1
 See application file for complete search history.

(56) References Cited

U.S. PATENT DOCUMENTS

| | | | |
|---|---|---|---|
| 4,302,518 A | 11/1981 | Goodenough et al. | |
| 6,582,854 B1 | 6/2003 | Qi | |
| 6,589,499 B2 | 7/2003 | Gao et al. | |
| 7,235,193 B2 | 6/2007 | Park et al. | |
| 7,384,706 B2 | 6/2008 | Suhara et al. | |
| 7,883,644 B2 | 2/2011 | Paulsen et al. | |
| 2002/0076613 A1 | 6/2002 | Lee et al. | |
| 2002/0122985 A1 | 9/2002 | Sato et al. | |
| 2002/0192552 A1 | 12/2002 | Lampe-Onnerud et al. | |

(Continued)

FOREIGN PATENT DOCUMENTS

| CN | 1515041 A | 7/2004 |
|---|---|---|
| CN | 1565063 A | 1/2005 |

(Continued)

OTHER PUBLICATIONS

Machine translation of Choi, KR 1020030034762, retrieved from <http://kposd.kipo.go.kr:8088/up/kpion/> on Feb. 15, 2014.*

(Continued)

*Primary Examiner* — Cynthia K. Walls
(74) *Attorney, Agent, or Firm* — Lerner, David, Littenberg, Krumholz & Mentlik, LLP (57) ABSTRACT

Provided is a cathode material for a lithium secondary battery, comprising a heat-treated mixture of an oxide powder (a) represented by Formula I and an oxide powder (b) represented by Formula II, wherein a mixing ratio of the oxide powder (a):oxide powder (b) is in a range of 30:70 to 90:10, the oxide powder (a) is monolithic particles having a D50 of more than 10 μm, and the oxide powder (b) is agglomerated particles having a D50 of less than 10 μm, and heat treatment is carried out at a temperature of 400° C. or higher.

$$LiCoO_2 \quad (I)$$

$$Li_zMO_2 \quad (II)$$

wherein $0.95 < z < 1.1$; $M = Ni_{1-x-y}Mn_xCo_y$, $0 < y < 0.5$, and a ratio of Mn to Ni $(x/(1-x-y))$ is in a range of 0.4 to 1.1.

8 Claims, 2 Drawing Sheets

(56) References Cited

U.S. PATENT DOCUMENTS

| | | | |
|---|---|---|---|
| 2003/0108790 A1* | 6/2003 | Manthiram et al. | 429/218.1 |
| 2004/0076882 A1* | 4/2004 | Hosoya et al. | 429/223 |
| 2004/0110063 A1 | 6/2004 | Uchitomi et al. | |
| 2004/0121234 A1 | 6/2004 | Le | |
| 2004/0200998 A1 | 10/2004 | Park et al. | |
| 2005/0281727 A1 | 12/2005 | Yoshizawa et al. | |
| 2006/0105239 A1 | 5/2006 | Paulsen et al. | |
| 2006/0257737 A1 | 11/2006 | Goh et al. | |
| 2007/0218363 A1* | 9/2007 | Paulsen et al. | 429/231.3 |
| 2008/0008933 A1 | 1/2008 | Lampe-Onnerud | |

FOREIGN PATENT DOCUMENTS

| | | |
|---|---|---|
| JP | 11067209 | 3/1999 |
| JP | 2000195517 A | 7/2000 |
| JP | 2002110251 A | 4/2002 |
| JP | 2002321921 A | 11/2002 |
| JP | 2003059490 A | 2/2003 |
| JP | 2003223887 A | 8/2003 |
| JP | 2003263978 A | 9/2003 |
| JP | 2003331843 A | 11/2003 |
| JP | 2006331943 A | 12/2006 |
| KR | 1020010047099 | 6/2001 |
| KR | 20020024520 A | 3/2002 |
| KR | 1020030034762 | 5/2003 |
| KR | 1020030034762 A | 5/2003 |
| KR | 1020070095201 A | 9/2007 |
| WO | 03/092099 A1 | 11/2003 |
| WO | WO 03/092099 A1 | 11/2003 |
| WO | 2005064715 A1 | 7/2005 |
| WO | WO 2005/064715 A1 | 7/2005 |

OTHER PUBLICATIONS

Nukuda, Development of a lithium ion battery using a new cathode material, Journal of Power Sources, 146 (2005) 611-616.*

Chen et al., "Studies of LiCoO2 coated with metal oxides", Electrochemical and Solid-State Letter, (6) 11, pp. A221-A224 (Unknown Month 2003).

* cited by examiner

FIG. 4

CATHODE MATERIALS FOR LITHIUM BATTERY HAVING HIGHER PERFORMANCE

CROSS REFERENCE TO RELATED APPLICATION

The present application claims priority from Korean Patent Application No. 10-2006-0025116, filed Mar. 20, 2006, the disclosure of which is incorporated herein by reference.

FIELD OF THE INVENTION

The present invention relates to a high-performance cathode material for a lithium secondary battery. More specifically, the present invention relates to a cathode material for a lithium secondary battery, comprising a heat-treated mixture of a lithium cobalt oxide powder (a) and a lithium metal oxide powder (b), wherein a mixing ratio of two oxide powders (oxide powder (a):oxide powder (b)) is in a range of 30:70 to 90:10, the oxide powder (a) is monolithic particles having an average particle size (D50) of more than 10 µm, and the oxide powder (b) is agglomerated particles having a D50 of less than 10 µm, and heat treatment is carried out at a temperature of 400° C. or higher.

BACKGROUND OF THE INVENTION

In recent years, rechargeable secondary batteries are widely used as an energy source for wireless mobile equipment. Among other things, there has been an increasing demand for lithium secondary batteries due to high-energy density, high-discharge voltage and superior power output stability.

The lithium secondary battery uses a metal oxide such as $LiCoO_2$ as a cathode material and a carbonaceous material as an anode material, and is fabricated by disposition of a porous polyolefin separator between the anode and the cathode and impregnation of the resulting electrode assembly with a non-aqueous electrolyte containing a lithium salt such as $LiPF_6$. Even though it is widely used as a cathode material for the lithium secondary battery, $LiCoO_2$ suffers from various problems such as relative expensiveness, low charge/discharge capacity of about 150 mAh/g, instability of the crystal structure at a voltage of more than 4.3 V, and the risk of ignition by reaction with an electrolyte. Furthermore, $LiCoO_2$ also suffers from the disadvantage of a significant fluctuation in properties in response to a slight change of some parameters during a fabricating process. In particular, some changes in process parameters lead to significant fluctuations in cycle properties and high-temperature storage properties at high potentials.

In this regard, in order to ensure operation of the battery at high potentials there have been suggested a method of coating the outer surface of $LiCoO_2$ with a metal (for example, aluminum), and a method of subjecting $LiCoO_2$ to heat treatment or mixing $LiCoO_2$ with other materials, and the like. However, the secondary battery fabricated using such a cathode material exhibits poor safety at high potentials or suffers from limitations in application thereof to large scale production of batteries.

Recently, as secondary batteries have also drawn a great deal of attention as a power source for electric vehicles (EVs) and hybrid electric vehicles (HEVs) which are presented as countermeasures capable of solving problems of air pollution caused by fossil-fuel driven vehicles such as gasoline vehicles and diesel vehicles, it is expected that the demand for secondary batteries will further increase in the future. Therefore, there are increased concerns on the aforementioned problems, as well as the safety and high-temperature properties of batteries at high potentials.

As one of various schemes to cope with such problems of $LiCoO_2$, a technique was proposed which uses a mixture of more than two different lithium transition metal oxides as a cathode material to compensate disadvantages that may occur upon preparation of the cathode material via a single use of each lithium transition metal oxide. As disclosed in Korean Patent No. 424638, the cathode material in the form of such a mixture is prepared generally by separately preparing each lithium transition metal oxide and then mixing the resulting oxides. Each lithium transition metal oxide is commonly prepared by mixing a certain lithium compound and a transition metal compound and heat-treating the mixture.

On the other hand, there are some examples involving a heat treatment during preparation of the cathode material. Such a heat treatment is intended for surface treatment of the cathode material or the modification of the physical properties of the mixture as the cathode material.

For example, Korean Patent No. 315227 discloses a technique for increasing a concentration of cobalt ions up to a certain depth from the particle surface so as to prevent the dissolution of manganese ions, in which a mixture of a lithium salt, a cobalt salt, an alcohol and a chelating agent is heated to prepare a sol- or gel-like material and the resulting material is mixed with $Li_2MnO_4$, followed by heat treatment.

However, the aforementioned techniques have inevitable shortcomings such as complicated processes for achieving desired physical properties and the consequent increased production costs of the secondary batteries. Furthermore, it was confirmed that high potential and high temperature properties of the battery are not improved to a desired level only by a simple heat treatment as in the above-mentioned conventional arts, because such a simple heat treatment shows no beneficial effects on the physical properties of crystalline particles.

In addition, the conventional cathode materials, in the form of a mixture, suffer from limitations in achieving synergistic effects far surpassing the effects obtained by simply combining two components.

SUMMARY OF THE INVENTION

Therefore, the present invention has been made to solve the above problems and other technical problems that have yet to be resolved.

It is an object of the present invention to provide a novel morphology of a cathode material having superior safety at high potentials and improved high-temperature storage properties, and a lithium secondary battery comprising the same.

It is another object of the present invention to provide a method for preparing a cathode material for a lithium secondary battery, comprising $LiCoO_2$ less sensitive to process parameters by co-firing $LiCoO_2$ and a solid state lithium buffer material to adjust a stoichiometric composition of lithium and cobalt to a desired range, taking into consideration the fact that a property fluctuation of $LiCoO_2$ in a mass-production process is primarily due to the difference of lithium chemical potential in $LiCoO_2$.

It is yet another object of the present invention to provide a method for preparing a cathode material for a lithium secondary battery, which is capable of achieving great reduction of the production process, reduction of production costs, and superior properties by mixing individual raw materials at the precursor stage thereof and heat-treating the mixture upon preparation of the cathode material, as compared to when $LiCoO_2$ and $Li_zMO_2$ are mixed following separate heat treatment of them in each manufacturing process.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above and other objects can be accomplished by the provision of a cathode material for a lithium secondary battery, comprising a heat-treated mixture of an oxide powder (a) represented by Formula I below and an oxide powder (b) represented by Formula II below, wherein a mixing ratio of the oxide powder (a):oxide powder (b) is in a range of 30:70 to 90:10, the oxide powder (a) is monolithic particles having a D50 of more than 10 μm, and the oxide powder (b) is agglomerated particles having a D50 of less than 10 μm, and heat treatment is carried out at a temperature of 400° C. or higher.

$LiCoO_2$ (I)

$Li_zMO_2$ (II)

wherein $0.95<z<1.1$; $M=Ni_{1-x-y}Mn_xCo_y$, $0<y<0.5$, and a ratio of Mn to Ni ($x/(1-x-y)$) is in a range of 0.4 to 1.1.

The cathode material according to the present invention is a mixture produced by the heat treatment of two or more materials, exhibits a novel morphology which was not provided by conventional arts, and has excellent high-potential safety and high-temperature storage properties.

The mixing ratio of two oxide powders in the heat-treated mixture is in a range of 30:70 to 90:10, as defined above. If a content of the oxide powder (a) is excessively low or a content of the oxide powder (b) is excessively high, this may lead to a decrease in discharge capacity. On the other hand, if a content of the oxide powder (a) is excessively high or a content of the oxide powder (b) is excessively low, this may lead to an increase in production costs of the cathode material. Further, where it is outside the above-specified content range (mixing ratio), it is impossible to achieve desired improvements in high-potential safety and high-temperature storage properties. More preferably, the mixing ratio of (a) and (b) is in a range of 40:60 to 70:30.

As defined above, the cathode material of the present invention is of a specific morphology.

First, the oxide powder (a) is composed of a monolithic structure, and therefore has substantially no inner porosity and exhibits a particle size of more than 10 μm. An increase in the particle size leads to improved stability of crystalline particles, and enables easy fabrication of a battery comprising such an oxide powder, thereby enhancing the process efficiency.

Generally, where a particle size of the cathode material is larger, this may lead to a decrease in a surface area for reaction with an electrolyte inside a battery cell, thereby causing significant deterioration of high-voltage storage properties and rate properties and consequently being required to decrease a particle diameter of the cathode material. Whereas, the use of the cathode material with a large particle diameter leads to relatively high structural stability including excellent high-temperature properties and a decrease in adverse side reactions including electrolyte decomposition, as compared to the cathode material having a small particle diameter.

However, it was surprisingly confirmed that the heat-treated mixture according to the present invention maintains a desired level of excellent high-voltage storage properties and rate properties, even though the oxide powder (a) has a large particle diameter of more than 10 μm.

The reason why such incompatible properties can be simultaneously accomplished is because $LiCoO_2$ having a stoichiometric composition or a mixture having a proper lithium chemical potential can be obtained, due to buffering effects of the oxide powder (b) of Formula II as the lithium buffer material, on the oxide powder (a) of Formula I, during the heat treatment process.

Generally, if the Li content in stoichiometric $LiCoO_2$ (Li:Co=1:1) is higher than 1:1, $LiCoO_2$ will coexist with a secondary phase which contains the excess lithium and largely consists of $Li_2CO_3$. $Li_2CO_3$ impurities in the $LiCoO_2$ cathode material will lead to poor storage properties at elevated temperatures and voltages.

If the Li content is lower than 1:1, then the cathode material contains divalent cobalt, i.e. $LiCoO_2$ coexists with cobalt oxides ($CoO_x$). Lithium-deficient $LiCoO_2$ shows poor cycling stability at a high voltage (>4.3V), especially at an elevated temperature. It is speculated that the higher catalytic activity of divalent cobalt present in the cobalt oxide phase accelerates the undesired oxidation of an electrolyte on the surface of $LiCoO_2$. Alternatively, divalent cobalt might, especially at a high voltage, dissolve in the electrolyte, and undergo precipitation at the anode side, thereby damaging a solid electrolyte interphase (SEI) layer on the anode.

Generally, mass-produced $LiCoO_2$ is somewhat lithium-excess or lithium-deficient. The lithium chemical potential of such a product has always a higher value equilibrated with $Li_2CO_3$, or a lower value equilibrated with $CoO_x$. Therefore, the mass-produced $LiCoO_2$ is difficult to have a proper value between the upper and the lower chemical potentials (the potential of Li:Co=1:1 composition).

The performance properties of commercial $LiCoO_2$ as the electrode material depend very sensitively on the exact Li:Co ratio. Upon slight deviation from the exact Li:Co ratio, the strong change in properties of $LiCoO_2$ is caused by the step-like change of lithium chemical potential. Accordingly surface properties, which dominate the storage properties and high-voltage cycling properties, sharply change stepwise as well.

In this connection, the oxide powder (b) of Formula II in the heat-treated mixture of the present invention is preferably a material that the lithium chemical potential varies little with lithium stoichiometry and the absolute value of a slope of a chemical potential versus lithium stoichiometry is much smaller than that of the oxide powder (a) of Formula I, and therefore may be composed of a lithium buffer material that can serve as a lithium acceptor and/or a lithium donor.

That is, at a heat treatment temperature, possibly above 400° C., preferably at a temperature of 400 to 1050° C., the transition metal cations in the oxide are still frozen, but the oxygen becomes mobile (for reference, lithium becomes mobile below that temperature). Now the lithium chemical potential and the oxygen potential equilibrate. At that temperature, the buffer can consume lithium by decomposition of $Li_2CO_3$ impurities, or it can release lithium to lithiate the cobalt oxide impurities. Finally, the lithium chemical potential of the oxide powder (a), i.e. $LiCoO_2$, equilibrates at the potential of the buffer material (b).

In this manner, co-firing of the oxide powder (a) with the buffer material (b) eliminates the sharp step-like change of the lithium potential of $LiCoO_2$, thus resulting in fixation of the lithium potential within a preferred range. Then a small deviation of lithium stoichiometry away from the optimum stoichiometric value would only cause a small change of the lithium chemical potential, as a result surface properties would be only scattered slightly from the optimum and generally, a more robust material (mixture) less sensitive to changes of the composition is achieved.

Meanwhile, the oxide powder (b) has an agglomerated structure, i.e. in the form of an agglomerate of finely-divided powders, which provides inner porosity. Such an agglomerated particle structure can exert high-rate properties simultaneously with an enhanced reversible capacity of the cathode, by provision of a maximum surface area for reaction with the electrolyte.

For example, the oxide powder (a) is a potato-shaped monolithic particle having a D50 of more than 10 μm, preferably more than 15 μm. Particularly, when it is desired to use a cathode material containing the oxide powder (a) in a polymer battery cell, more preferred is a D50 of 15 to 20 μm. For application of the oxide powder (a) in a cylindrical or prismatic cell, a D50 of 20 to 30 μm is more preferred.

The oxide powder (b) having the agglomerated structure is the agglomerate of fine particles having a size of 1 μm to 5 μm. The D50 of the powder (b) is in a range of less than 10 μm, preferably less than 8 μm, more preferably 4 to 7 μm. Particularly preferably, more than 90% of the powder (b) may be composed of the agglomerate of fine particles having a particle size (D50) of 1 to 4 μm.

Due to specific morphology and the relevant modification of the lithium chemical potential as described above, the cathode material according to the present invention exhibits significant differences in physical properties, as compared to those properties obtained by a simple mixture of the oxide powders (a) and (b). These facts can also be easily confirmed through Examples and Comparative Examples that will be illustrated hereinafter.

In accordance with another aspect of the present invention, there is provided a method for preparing a cathode material for a lithium secondary battery.

Specifically, the cathode material can be prepared by mixing a Co-containing precursor, an Mn—Ni-containing precursor, and optionally an Li-containing precursor, and heating heat-treating the mixture at a temperature of more than 400° C. under an oxygen-containing atmosphere.

The method of the present invention can achieve great reduction of the production process and reduction of production costs, by preparing a mixture of two or more lithium transition metal oxides as the cathode material via mixing and heat treatment processes of raw materials without a surface coating process as shown in conventional arts, or if necessary, by mixing raw materials, followed by a single heat treatment of the mixture to simultaneously prepare a cathode material. In addition, the-thus obtained heat-treated mixture exhibits excellent high-potential safety and high-temperature storage properties, due to specific morphology and the relevant modification of the lithium chemical potential as described above.

Preferably, the heat treatment may be carried out at a temperature of 400 to 1050° C. If the heat treatment temperature is excessively low, this may result in insufficient progress of the reaction between precursors, thus leaving large amounts of unreacted materials and it is impossible to prepare a homogenous heat-treated mixture. On the other hand, if the heat treatment temperature is excessively high, this may undesirably lead to destruction of the crystalline structure for intercalation-deintercalation of lithium ions.

More preferably, the heat treatment may be carried out at a temperature of 700 to 1050° C. in an ambient atmosphere. Therefore, there is no need for expensive equipment for formation of special conditions. Particularly preferred heat treatment temperature is in a range of 900 to 1000° C.

Examples of the Co-containing precursor may include, but are not limited to, a cobalt oxide, a cobalt hydroxide, a cobalt oxohydroxide, a cobalt carbonate, a cobalt carbonate-hydroxide, and a lithium cobalt oxide. These materials may be used alone or in any combination thereof. Particularly preferred are $Co_3O_4$ and $LiCoO_2$.

Examples of the Mn—Ni-containing precursor may include, but are not limited to, a mixed oxide, a mixed hydroxide, a mixed oxohydroxide, a mixed carbonate, a mixed carbonate-hydroxide, and a mixed lithium transition metal oxide of manganese and nickel. These materials may be used alone or in any combination thereof. Particularly preferred are mixed hydroxides of Formula MOOH ($M=Ni_{1-x-y}Mn_xCo_y$: and x, y and z are as defined above) and lithium-mixed transition metal oxides of Formula $Li_zNi_{1-x-y}Mn_xCO_yO_2$ (x, y and z are as defined above).

A typical example of the Li-containing precursor may be $LiCO_3$, but is not limited thereto. Therefore, other Li-containing precursor materials may be used alone or in any combination thereof.

As the Co-containing precursor, a material having a particle size of more than 10 μm may be used as described hereinbefore. When $LiCoO_2$ is directly used as the Co-containing precursor, $LiCoO_2$ converts into the oxide powder (a) having a slightly increased size by the reaction occurring upon heat treatment. Therefore, it is preferred to use $LiCoO_2$ having a D50 of 8 to 9 μm. Whereas, the Mn—Ni-containing precursor converts into an agglomerated structure by the reaction occurring upon heat treatment. It is preferred to use the Mn—Ni-containing precursor material having a D50 of less than 10 μm.

As the Co-containing precursor, $LiCoO_2$ may also be used. In this case, it is possible to prepare the cathode material by mixing monolithic $LiCoO_2$ and the Mn—Ni-containing precursor having a composition of Formula $Li_zNi_{1-x-y}Mn_xCo_yO_2$ (0<y<0.5, and a ratio of Mn to Ni (x/(1−x−y)) is in a range of 0.4 to 1.1) and subjecting the resulting mixture to the above-mentioned heat treatment process.

In accordance with a further aspect of the present invention, there is provided a lithium secondary battery comprising the above-mentioned heat-treated mixture as a cathode material. Generally, the lithium secondary battery is comprised of a cathode, an anode, a separator disposed therebetween and a lithium-containing non-aqueous electrolyte.

The cathode is, for example, fabricated by applying a mixture of the above cathode material, a conductive material and a binder to a cathode current collector, followed by drying and pressing. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode material. In addition, the current collector may take various forms including films, sheets, foils, nets, porous structures, foams and non-woven fabrics.

The conductive material is typically added in an amount of 1 to 50% by weight, based on the total weight of the mixture including the cathode material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the electrode material and conductive material, and in binding with the current collector. The binder is typically added in an amount of 1 to 50% by weight, based on the total weight of the mixture including the cathode material. As examples of the binder, mention may be made of polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying an anode material to an anode current collector, followed by drying. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode material. In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The lithium-containing non-aqueous electrolyte is composed of a non-aqueous electrolyte and a lithium salt.

As the non-aqueous electrolyte that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Where appropriate, an organic solid electrolyte or an inorganic solid electrolyte may be utilized as the non-aqueous electrolyte.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$—$LiI$—$LiOH$ and $Li_3PO_4$—$Li_2S$—$SiS_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

$Co_3O_4$, a transition metal oxohydroxide of Formula MOOH (M=$Mn_{1/3}Ni_{1/3}Co_{1/3}O_2$), and $Li_2CO_3$ were mixed to prepare a reaction mixture. A mixing ratio of reaction components was set to a mole fraction of 1.01:1 of a total transition metal in reactants $Co_3O_4$ and MOOH precursor to Li in a final product $Li_2CO_3$. $Co_3O_4$ used was a material having a structure similar to a monolithic structure of a final product $LiCoO_2$ particles and a D50 value slightly smaller than that of $LiCoO_2$ (10 to 20% less). The MOOH used was a material composed of porous particles and having a particle size of 3 to 8 μm, wherein at least 50% (v/v) fraction is almost spherical particles. The resulting mixture was heat-treated at 1000° C. for 24 hours under atmospheric pressure.

As a result, a heat-treated mixture of $LiCoO_2$ and $LiMO_2$ having a composition of $LiMn_{1/3}Ni_{1/3}Co_{1/3}O_2$ was obtained (weight ratio of $LiCoO_2$:$LiMO_2$=50:50). $LiCoO_2$ was obtained as monolithic particles having a D50 of about 15 to 20 μm. $LiMO_2$ was obtained as particles having a D50 of about 5 to 8 μm, corresponding to an agglomerate of fine particles with a particle size of about 1 to 2 μm.

Example 2

A heat-treated mixture was prepared in the same manner as in Example 1, except that a weight ratio of $LiCoO_2$ and $LiMO_2$ in the mixture was 80:20.

Example 3

A heat-treated mixture was prepared in the same manner as in Example 1, except that a transition metal composition of an oxohydroxide was $Ni_{0.533}Mn_{0.267}Co_{0.2}$, a heat treatment temperature was below 920° C., and air was introduced via a pump into a reaction vessel during the reaction.

Example 4

A heat-treated mixture was prepared in the same manner as in Example 3, except that a weight ratio of $LiCoO_2$ and $LiMO_2$ in the mixture was 70:30.

Example 5

A heat-treated mixture was prepared in the same manner as in Example 3, except that $CoCO_3$ having a D50 of 30 μm was used as a Co-containing precursor, and a weight ratio of $LiCoO_2$ and $LiMO_2$ in the mixture was 70:30.

Example 6

Monolithic $LiCoO_2$ having a D50 of 15 to 20 μm was used as a Co-containing precursor, and MOOH (M=$Ni_{0.533}Mn_{0.267}Co_{0.2}$) was used as an Mn—Ni-containing precursor. The MOOH was slightly porous particles, and at least 50% (v/v) fraction thereof was composed of almost spherical particles having a particle size of 3 to 8 μm. A mixing ratio of reaction components was set to a mole fraction of 1.01:1 of a total transition metal in the MOOH precursor to Li in $Li_2CO_3$. Heat treatment was carried out at 920° C. for 24 hours. As a result, a heat-treated mixture of $LiCoO_2$ and $LiMO_2$ in a weight ratio of 1:1 was obtained.

Example 7

A heat-treated mixture of $LiCoO_2$ and $LiMO_2$ in a weight ratio of about 7:3 was prepared in the same manner as in Example 6, except that MOOH (M=$Ni_{1/3}Mn_{1/3}Co_{1/3}$) was used and heat treatment was carried out at 1000° C. for 24 hours.

Example 8

Monolithic $LiCoO_2$ having a D50 of 15 to 20 μm was used as a Co-containing precursor, and $LiMO_2$ (M=$Ni_{1/3}Mn_{1/3}Co_{1/3}$) having a D50 of 5 to 8 μm was used as an Mn—Ni-containing precursor. The $LiMO_2$ was composed of an agglomerate of fine particles having low inner porosity and a particle size of about 2 μm. Heat treatment was carried out at 850° C. for 10 hours. As a result, a heat-treated mixture of $LiCoO_2$ and $LiMO_2$ in a weight ratio of 90:10 was obtained.

Example 9

A heat-treated mixture of $LiCoO_2$ and $LiMO_2$ in a weight ratio of about 50:50 was prepared in the same manner as in Example 6, except that MOOH (M=$Ni_{0.533}Mn_{0.267}Co_{0.2}$) was used and heat treatment was carried out at 800° C. for 10 hours.

Example 10

3.6 kg of inexpensive $LiCoO_2$ (available from a low-cost producer) and 400 g of commercial $LiMn_{1/3}Ni_{1/3}Co_{1/3}O_2$ were mixed by slow ball rolling, followed by a co-sintering at 900° C. for 10 hours in air.

Figure 1:
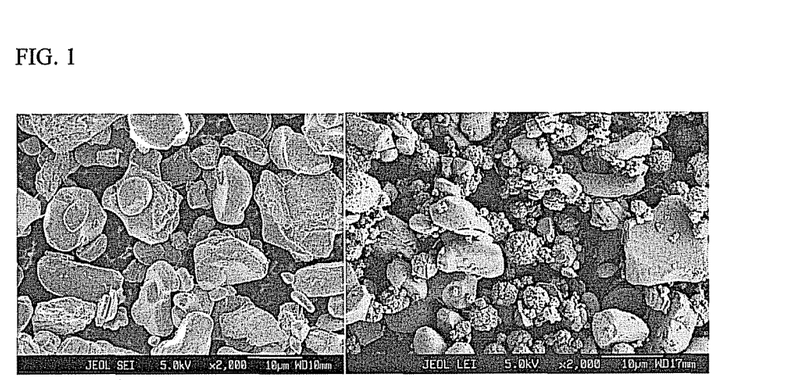
FIG. 1 is an FESEM (Field Emission Scanning Electron Microscope) image showing $LiCoO_2$ used as a Co-containing precursor in Example 10 and a heat-treated mixture according to the present invention.

FIG. 1 shows FESEM micrographs of the $LiCoO_2$ used as the Co-containing precursor and the heat-treated mixture. As shown in FIG. 1, the morphology of the heat-treated mixture was just the same as that of the precursor. Particularly, $LiCoO_2$ powder was composed of a monolithic structure and $LiMn_{1/3}Ni_{1/3}Co_{1/3}O_2$ powder was composed of an agglomerated structure. $LiCoO_2$ and $LiMn_{1/3}Ni_{1/3}Co_{1/3}O_2$ were still separated particles and were not sintered into agglomerates. However, as indicated by a dotted circle in FIG. 1, it can be seen that large numbers of $LiMn_{1/3}Ni_{1/3}Co_{1/3}O_2$ particles were brought into intimate contact with surfaces of $LiCoO_2$ particles, thus representing that high-temperature heat treatment reaction took place.

In this connection with the high-temperature heat treatment of the mixture, a temperature of 900° C. is high enough for a fast equilibration of lithium and oxygen chemical potentials. Therefore, the lithium potential of $LiCoO_2$ is fixed in a range that is above the lower value for $LiCoO_2$ coexisting with the cobalt-oxide, and below the upper value for $LiCoO_2$ coexisting with $Li_2CO_3$. Furthermore, the $LiCoO_2$ was basically free of the cobalt oxide or $Li_2CO_3$ impurities. The absence of these impurities was confirmed by pH titration.

Comparative Example 1

A non-heat treated mixture of $LiCoO_2$ and $LiMn_{1/3}Ni_{1/3}Co_{1/3}O_2$ in a weight ratio of 90:10 was prepared in the same manner as in Example 8. Upon examining the resulting mixture, it was confirmed that there was no intimate contact structure as shown in the region indicated by a dotted circle of FIG. 1, thus representing the presence of simply mixed state of both components.

Experimental Example 1

In order to confirm effects of heat-treatment in the present invention, the electrochemical properties of heat-treated mixtures prepared in Examples 1, 6 and 8 and a simple mixture prepared in Comparative Example 1 were measured. Table 1 below summarizes the results.

TABLE 1

| Sample | Capacity (mAh/g) at C/5, 4.5 V, 50° C. | Capacity fading (% per 100 cycle) 4.5 V 25° C. | Capacity fading (% per 100 cycle) 4.5 V 50° C. |
|---|---|---|---|
| Example 1 | 185 | 6.4% | 15% |
| Example 6 | 187 | 3.2% | 10% |
| Example 8 | 187 | 2.0% | 6% |
| Comparative Example 1 | 190 | 12% | 31% |

As can be seen from the results of Table 1, various heat-treated mixtures of the present invention (Examples 1, 6 and 8) exhibited a high cycling stability at a high voltage, whereas a simple mixture of $LiCoO_2$ with $LiMn_{1/3}Ni_{1/3}Co_{1/3}O_2$ without heat-treatment (Comparative Example 1) was not sufficient to achieve a high cycling stability at a high voltage.

Experimental Example 2

Figure 2:
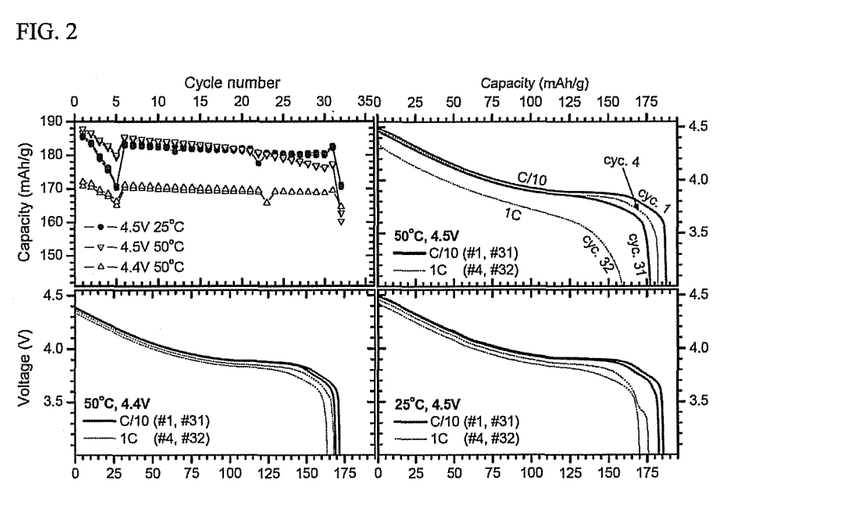
FIG. 2 is a graph showing cycling stability of a coin cell in Experimental Example 2, using a heat-treated mixture according to the present invention as a cathode material.

A cathode was prepared using a heat-treated mixture sample prepared in Example 8, as a cathode material. then, coin cells (with a Li metal anode) were prepared and were tested at 4.4V and 4.5V and at 25° C. and 50° C. FIG. 2 and Table 2 below summarize the obtained results for performance properties of cells.

TABLE 2

| Sample (Li:M target) | Capacity (mAh/g) at C/5 4.4 V 25° C. | Capacity (mAh/g) at C/5 4.5 V 50° C. | Capacity fading % per 100 cycles 4.4 V 50° C. | Capacity fading % per 100 cycles 4.5 V 25° C. | Capacity fading % per 100 cycles 4.5 V 50° C. |
|---|---|---|---|---|---|
| Cell of Example 8 | 171 | 187 | 2.5% | 2.0% | 6% |

From the results given in Table 2 and FIG. 2, it can be seen that the heat-treated mixture sample of Example 8 ($LiCoO_2$ having the lithium chemical potential fixed within a preferred range) has improved cycling properties at an elevated voltage.

Comparative Example 2

Except using low-price $LiCoO_2$ as a cathode material, a coin cell was prepared in the same manner as in Experimental Example 2, and tested under the same conditions. $LiCoO_2$ used in this Example was the same product which was used as the precursor in Example 8. The low-price $LiCoO_2$ powder was heated to 900° C. and refreshed to have the same heat treatment history as the heat-treated mixture of Example 8. However, the above comparative sample was not subjected to the treatment to achieve the equilibration of the lithium chemical potential by the action of the lithium buffer.

Figure 3:
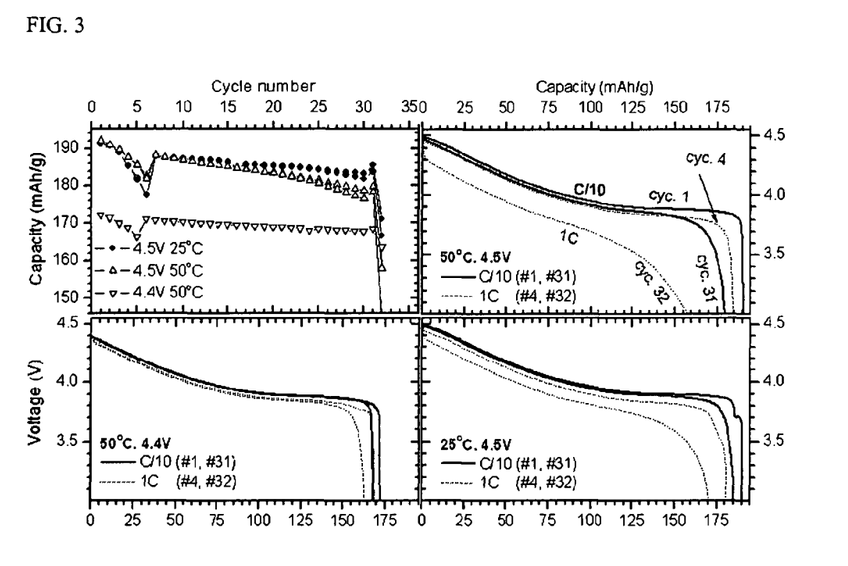
FIG. 3 is a graph showing cycling stability of a coin cell in Comparative Example 2, using inexpensive $LiCoO_2$ as a cathode material.

As shown in FIG. 3, the comparative sample exhibited excellent stability through the heat treatment, which was, however, lower than that of the heat-treated mixture (see FIGS. 2 and 3).

In addition, it can be seen that the comparative sample exhibited a significant decrease of the capacity at 4.5V, 50° C. as well as 4.5V, 25° C. (see C/10 data) and much more impedance built-up (see voltage depression of C/1).

Experimental Example 3

Commercial size polymer cells (3.6 mm thickness) were prepared at pilot plant scale. The polymer cells contained a cathode composed of 95 wt % of a heat-treated mixture (prepared in Example 8), 2.5 wt % of a PVdF binder and 2.5 wt % of a conductive material (Super P), double-side coated on 15 micrometer aluminum foil. The anode material was commercial MCMB (Mesocarbon microbead). A standard commercial electrolyte (not containing overcharge additives) was used. The anode loading was chosen to achieve balanced cells at a 4.4V cell voltage (anode capacity=cathode capacity charged to 4.45V versus $Li/Li^+$).

The polymer cells were cycled for 400 cycles (charge rate 0.6 C, discharge rate 1 C, 1 C=800 mA). Each 100th cycle was a "capacity check" cycle during which a slower charge/discharge rate (0.2 C) was applied. The cells were cycled at 3.0-4.2V, 3.0-4.3V, 4.0-3.5V or 3.0-4.35V. The cycling temperature was 23° C. or 45° C. Frequently the increase of thickness during extended cycling was checked. Furthermore, the evolution of resistance was checked by impedance measurement at 1000 Hz.

Figure 4:
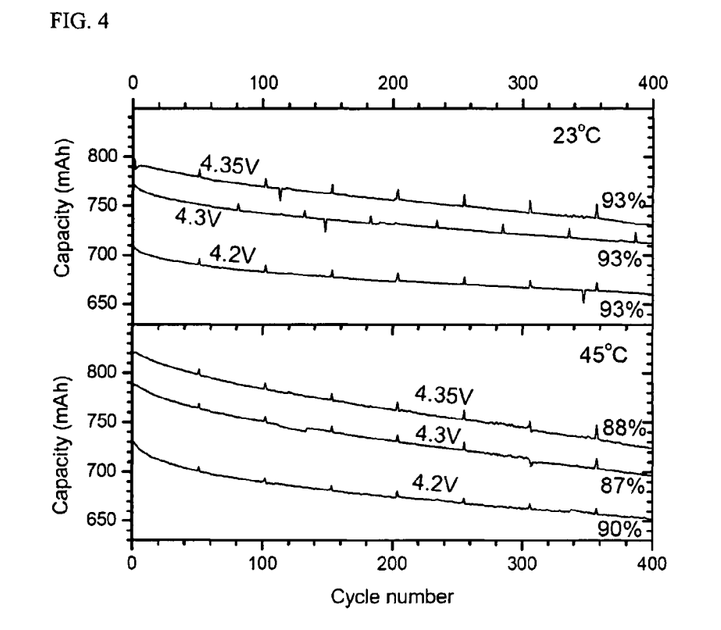
FIG. 4 is a graph showing cycling stability of a polymer cell in Experimental Example 3, using a heat-treated mixture according to the present invention as a cathode material (23° C., 45° C., 1 C rate (discharge)-0.6 C rate (charge), 3.0V to 4.2V, 3.0V to 4.3V, 3.0V to 4.35V, and 3.0V to 4.4V, 400 cycling).

FIG. 4 shows the measurement results of cycling stability at 4.2, 4.3, 4.35 and 4.4V at 23° C. and 45° C. Even at the high cell voltage of 4.4V, and at the elevated temperature of 45° C., a very high cycling stability without significant impedance built-up was observed.

More importantly, at 23° C. a similar rate of capacity loss was obtained for all voltages, and additionally, the capacity loss at C/1 and C/5 rates evolved similar patterns. Also at 45° C., a similar behavior of capacity loss was observed for all voltages. Therefore, it can be concluded that the increase of cell voltage did not cause degradation of the cathode.

Table 3 below summarizes the obtained results.

TABLE 3

| | | | Cycle 100 | Cycle 200 | Cycle 300 | Cycle 400 |
|---|---|---|---|---|---|---|
| Thickness (mm) 2 cells each | 23° C. | 4.2 V | 3.474/3.486 | 3.484/3.495 | 3.479/3.516 | 3.475/3.509 |
| | | 4.3 V | 3.519/3.536 | 3.522/3.533 | 3.549/3.554 | 3.562/3.561 |
| | | 4.35 V | 3.563/3.567 | 3.599/3.624 | 3.617/3.604 | 3.628/3.60 |
| | 45° C. | 4.2 V | 3.538/3.548 | 3.558/3.578 | 3.571/3.584 | 3.612/3.637 |
| | | 4.3 V | 3.611/3.610 | No data | 3.650/3.648 | 3.671/3.670 |
| | | 4.35 V | 3.607/3.626 | No data | 3.653/3.658 | 3.689/3.662 |

TABLE 3-continued

|  |  |  | Cycle 100 | Cycle 200 | Cycle 300 | Cycle 400 |
|---|---|---|---|---|---|---|
| Impedance | 23° C. | 4.2 V | 19.6/19.7 | 20.2/20.5 | 21.2/21.3 | 22.1/22.9 |
| 1 kHz |  | 4.3 V | 20.8/20.3 | 22.2/22.0 | 26.8/26.4 | 24.8/24.6 |
|  |  | 4.35 V | No data | 22.9/22.8 | 25.1/24.5 | 25.0/24.6 |
| mΩ | 45° C. | 4.2 V | 22.1/22.8 | 25.8/26.3 | 29.0/29.8 | 31.1/32.3 |
| 2 cells |  | 4.3 V | 24.6/25.1 | No data | 33.4/34 | 37.4/37.8 |
| each |  | 4.35 V | 25.3/25.6 | No data | 35.8/36.3 | 38.1/39.7 |

The obtained results clearly confirm that a modified $LiCoO_2$, with a lithium chemical potential fixed within a preferred range, has an improved excellent stability at a high voltage (at least up-to 4.4V versus $Li/Li^+$) even at an elevated temperature (45° C.).

Experimental Example 4

Polymer cells, prepared in the same manner as in Experimental Example 3, were charged to 4.2, 4.3 or 4.35V. After charging, the cells were placed in a temperature chamber and the temperature was increased to 90° C. over 1 hour. Cells were kept at 90° C. for 4 hours, and then the temperature was decreased to room temperature over 1 hour. During the temperature profile, the cell thickness was automatically monitored. Before and after the test, the cell capacity was measured at C/1 and C/5 rates.

No significant increase of thickness was observed at any of the investigated charge voltages. Also, the recovery ratio did not decrease with an increased storage voltage. It can be concluded that the increase of cell voltage did not cause degradation of the cathode.

Table 4 below summarizes the results.

TABLE 4

|  | Thickness increase (μm) | Before (mAh) | | After (mAh) | | Recovery (%) | |
|---|---|---|---|---|---|---|---|
|  |  | 1 C | 0.2 C | 1 C | 0.2 C | 1 C | 0.2 C |
| 4.2 V | <40 | 709 | 715 | 673 | 681 | 94.9 | 95.3 |
| 4.3 V | <30 | 773 | 779 | 739 | 752 | 95.7 | 96.5 |
| 4.35 V | <0 | 795 | 801 | 764 | 779 | 96.2 | 97.2 |

As can be seen from Table 4, the obtained results clearly confirm that modified $LiCoO_2$, with a lithium chemical potential fixed within a preferred range, has improved, excellent storage properties at a high voltage (at least up-to 4.4V versus $Li/Li^+$).

Comparative Example 3

Except using low-price $LiCoO_2$ as a cathode material, a polymer cell was prepared in the same manner as in Experimental Example 3, and tested under the same conditions as Experimental Examples 3 and 4. However, the cell always showed much inferior stability at >4.3V and always showed strong swelling during a 90° C. storage test.

Cells with standard commercial $LiCoO_2$ exhibited smooth cycling at 4.2-4.25V, but at 4.3-4.35V an increased rate of capacity loss was observed simultaneously with a stronger built-up of capacity difference (=impedance built-up). This behavior was caused by the lack of cycling stability of $LiCoO_2$ at voltages>4.3V versus $Li/Li^+$.

INDUSTRIAL APPLICABILITY

As apparent from the above description, the cathode material according to the present invention is a heat-treated mixture with a specific morphology and the relevant modification of a lithium chemical potential, and exhibits excellent high-potential safety and improved high-temperature storage properties. Furthermore, the present invention enables great reduction of the production process and production costs, by mixing individual raw materials at the precursor stage thereof, followed by heat treatment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode material for a lithium secondary battery, comprising:
   a heat-treated mixture of an oxide powder (a) represented by Formula I and an oxide powder (b) represented by Formula II;
   wherein:
   (1) a mixing ratio of the oxide powder (a):oxide powder (b) is in the range of 30:70 to 40:60 by weight;
   (2) the oxide powder (a) is monolithic particles having a D50 of more than 10 μm; and
   (3) the oxide powder (b) is agglomerated particles having a D50 of less than 10 μm;

$$LiCoO_2 \qquad (I)$$

$$Li_zMO_2 \qquad (II)$$

wherein $0.95<z<1.1$; $M=Ni_{1-x-y}Mn_xCo_y$, $0<y<0.5$, and a ratio of Mn to Ni $(x/(1-x-y))$ is in the range of 0.4 to 1.1,
   wherein lithium chemical potentials of the oxide powders (a) and (b) are equilibrated in the heat-treated mixture, and
   wherein the equilibrated lithium chemical potential is higher than a lithium chemical potential for coexistence of oxide powder (a) with cobalt oxide, and lower than a lithium chemical potential for coexistence of oxide powder (a) and lithium carbonate ($Li_2CO_3$).

2. The cathode material according to claim 1, wherein the oxide powder (a) has a D50 of more than 15 μm and the oxide powder (b) has a D50 of less than 8 μm.

3. The cathode material according to claim 2, wherein the oxide powder (a) has a D50 of 20 to 30 μm and the oxide powder (b) has a D50 of 4 to 7 μm.

4. The cathode material according to claim 1, wherein the oxide powder (b) is composed of an agglomerate of fine particles.

5. The cathode material according to claim 4, wherein more than 90% of the powder (b) is composed of the agglomerate of fine particles having a particle size of 1 to 4 μm.

6. A lithium secondary battery comprising the cathode material of claim 1.

7. The cathode material according to claim 1, wherein the mixture of the oxide powder (a) and the oxide powder (b) is heat treated at a temperature of 400° C. or higher.

8. The cathode material according to claim 1, where the heat-treated mixture consists of oxide powder (a) and oxide powder (b).

\* \* \* \* \*